May 20, 1969  F. H. LAND  3,444,911

PEACH PITTING AND QUARTERING MACHINE AND THE LIKE

Filed March 10, 1967  Sheet _1_ of 2

INVENTOR
FREDERIC HERMAN LAND
BY *William Frederick Werner*
ATTORNEY

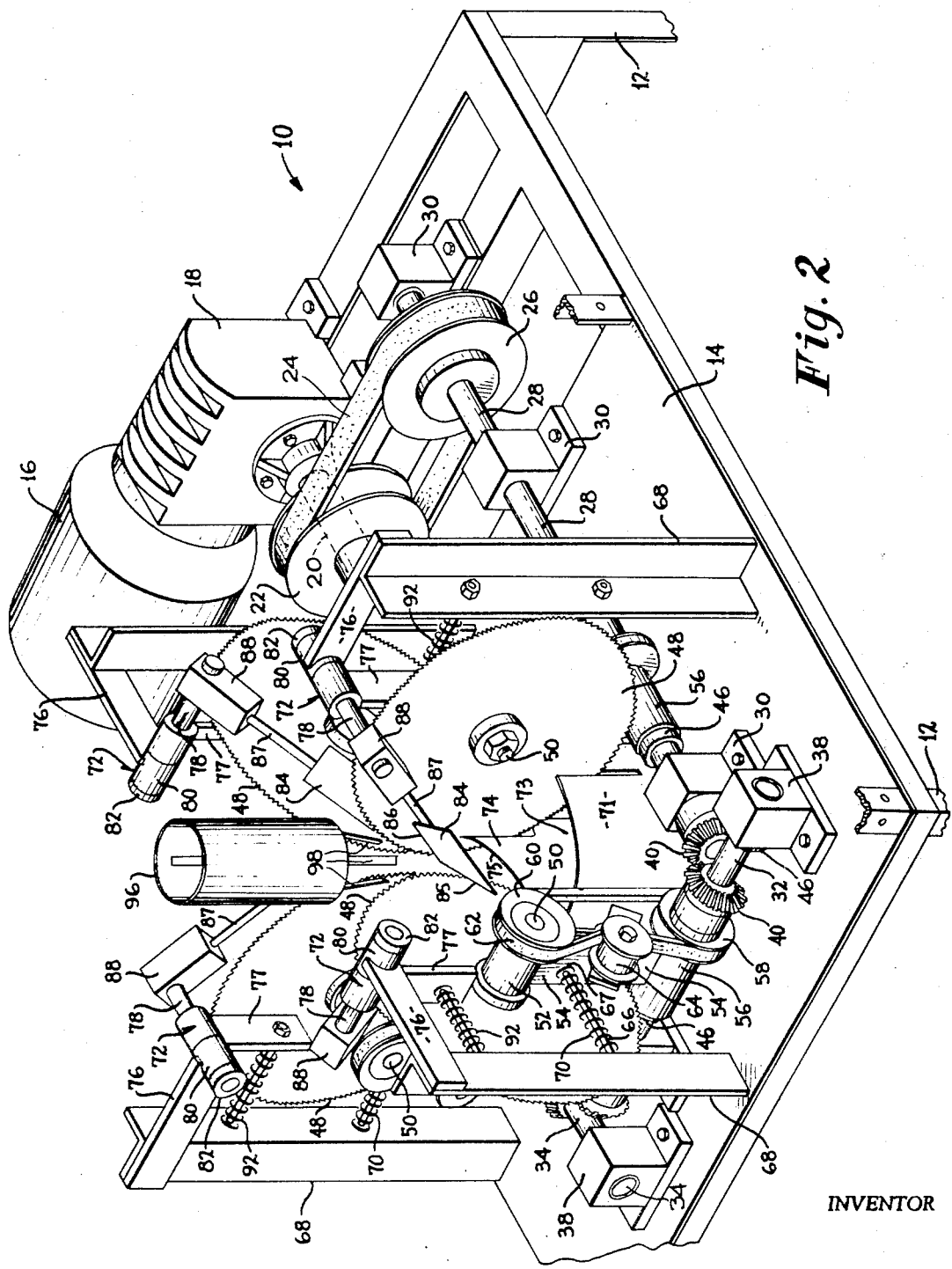

United States Patent Office 3,444,911
Patented May 20, 1969

3,444,911
PEACH PITTING AND QUARTERING MACHINE AND THE LIKE
Frederic H. Land, Greenville, S.C., assignor to Bevis Industries, Inc., Providence, R.I., a corporation of Florida
Filed Mar. 10, 1967, Ser. No. 622,150
Int. Cl. A23n 3/12
U.S. Cl. 146—28                            7 Claims

ABSTRACT OF THE DISCLOSURE

This invention relates to fruit pitting and quartering machines and more particularly to a device adapted to subdivide generally spherical or ovaloidal shaped fruit or vegetables into preferably quarters or other fractional parts while simultaneously depitting the fruit, without fracturing the pit, at a fast and continuous pace. Specifically, the instant invention provides a simplified machine which comprises cutting means including four rotary toothed blades resiliently mounted and with their planes angularly disposed generally in a convergent nearly intersecting manner at 90° apart, driven by suitable means in a common direction whereby the fruit is quartered and said fruit and the ejected pits are given a downward thrust; and the device further comprises a like number of resiliently mounted fruit stripping finger sub-assemblies all of which cooperate in a novel manner to aid in the removal of the fruit quarters away from a central pit collection tube.

Background

The special use in devising the improved machine is obviously for the canning industry where ovaloidal shaped fruit and the like must be cut and depitted preparatory to being processed in commercial size containers. While I am aware of prior art machines having a gravity feed and embodying a plurality of angularly disposed blades for segmenting fruit and arranged in a similar manner as the components of the instant machine, those patents of which I am aware do not embody toothed cutting blades in conjunction with my improved resilient yieldable mounting means for said blades and which together with the novel resiliently yieldable fruit stripping means associated therewith cooperate in a novelly improved manner which includes the blade teeth gripping and removing the pit to effect a more efficient continuous depitting and quartering of the fruit.

Brief summary of invention

The present invention provides for a top loaded, gravity feed machine in which the uncut fruit is deposited into the open mouth of a vertically disposed entering tube assembly located centrally over the intersection point of the four cutting blades. The blades are provided with interrelated variable speed driving means including pulley, belts and gears whereby all four blades are driven simultaneously by a common power source. The blade sub-assemblies include toothed blades which are spring loaded in the assembled device, as are the associated fruit-quarter stripping finger sub-assemblies. Accordingly, as the fruit is gravity fed into the machine through the top entering tube, it is guided by resilient centering finger means associated therewith to the blades below. As the spring-loaded blades slice the fruit into quarters, the blades move back following the contour of the pit, whereupon the teeth of the yieldably disposed blade grip on the pit rather than slicing into it, with the rotary direction of blade travel being such that the fruit quarters and pit are given a positive downward thrust against a plurality of spring-loaded stripping plate members disposed obliquely adjacent the cutting blades to strip the previously cut quarters from pit and to direct them away from the collection pit tube which is disposed centrally of and extends below the grouped blades.

The blades and stripping fingers spring back to their normal respective positions as soon as the pit has cleared the blades and the fruit quarters stripped therefrom. The results of the improved combination provide a type of servo actuation and/or self energizing of the resiliently mounted blade and stripping means during operation thereof. The pits, responsive to the downward thrust of the blade teeth, are directed into the pit collection tube where they are suitably cleared from the machine, as the fruit quarters fall substantially simultaneously through the enlarged fruit tube having suitable means associated therewith for receiving and guiding them out of the machine to the next station for processing. The cycle is continuously and effectively repeated to provide a simplified and efficient low cost operation.

Drawing figure description

The advantages and achievements of my improved machine will become more apparent from the following detailed description, taken in conjunction with the following illustrative drawing figures wherein:

FIGURE 2 is a perspective view of the working components of the machine, with the protective screen sides being omitted for clarity;

Detailed specification

Figure 1:
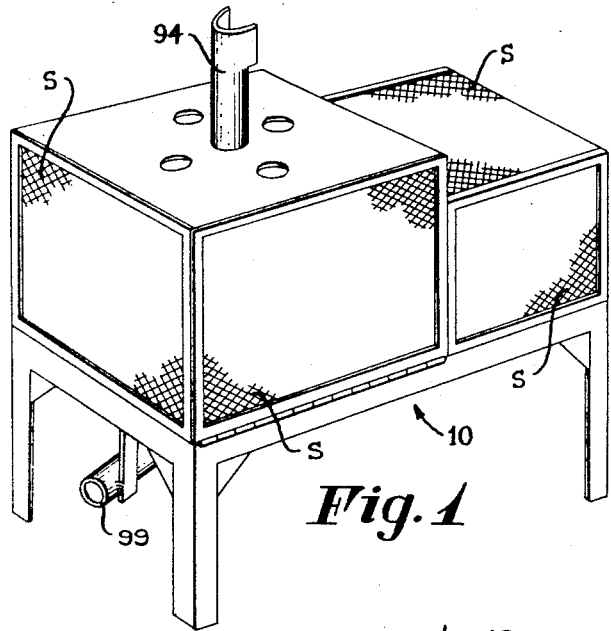
FIGURE 1 is a perspective view on a reduced scale of the assembled machine with protective screens in place.
Figure 4:
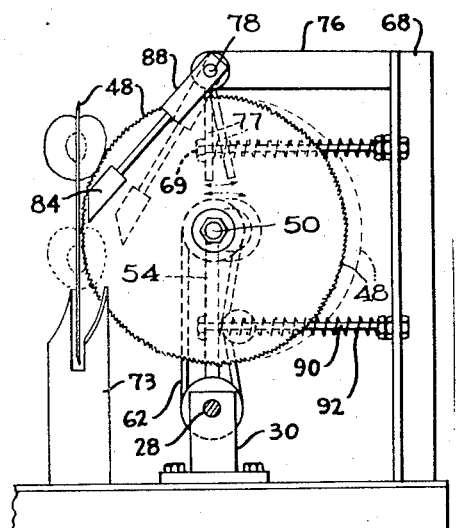
FIGURE 4 is a fragmentary elevational detail view, partially in cross-section, showing the pivotal mounting of the blade and stripping means.

Referring to the drawing figures, a suitable base support, designated generally at 10, is provided having suitable dimensions and fabricated of a rigid material such as angle and sheet members of bronze, steel and/or aluminum, with stainless steel at all points of contact with the fruit. As illustrated, the base is of generally square or rectangular frame configuration having supporting legs 12 at each corner and a top mounting plate 14 extending across at least a substantial portion of the framework to facilitate mounting of the blade and drive train components. The preferably all welded frame is free of deep corners or cracks in which food particles ordinarily collect, thereby making it easy to clean and to keep clean.

Figure 3:
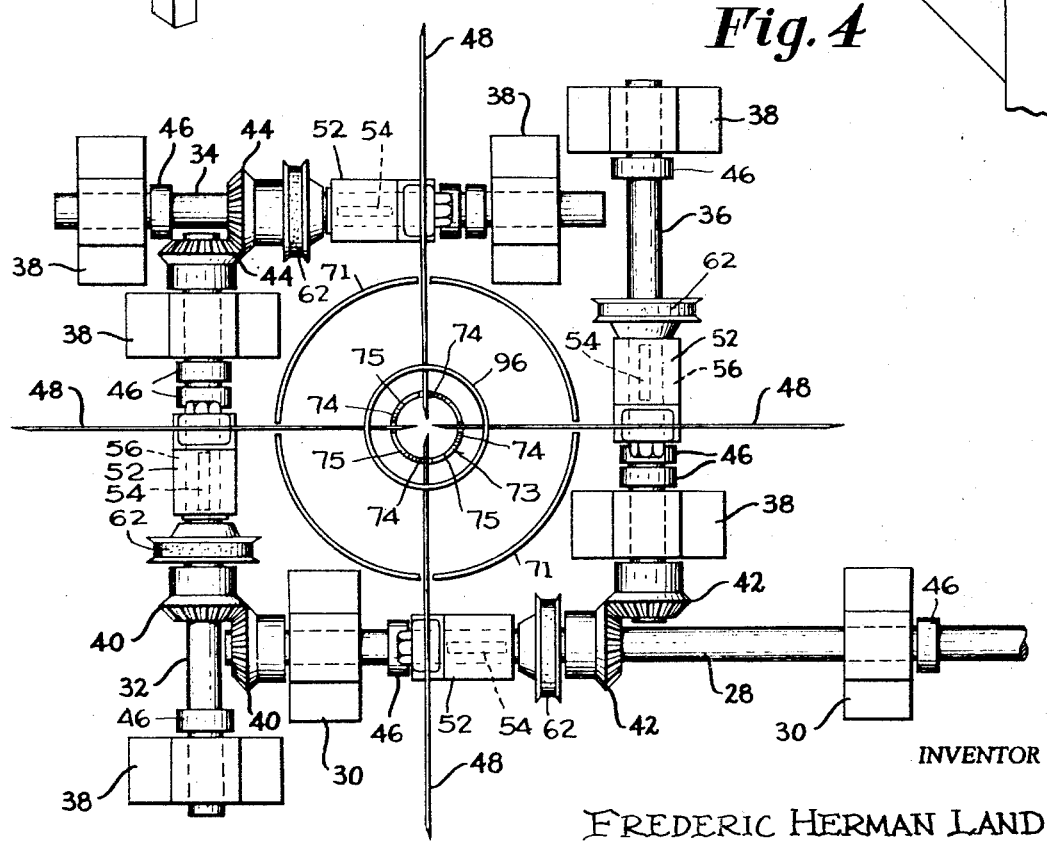
FIGURE 3 is a top plan view of the blade and drive shaft arrangements with the stripping fingers omitted for clarity.

The drive train comprises an electric motor 16, on the order of ½ horsepower, affixed to the base frame and driving through a commercially available gear reducer 18, which produces preferably an output of approximately 25 r.p.m. on an output shaft 20. A variable pitch pulley 22 is mounted on the shaft 20, and said pulley 22 drives, by means of a belt 24, a companion constant speed pulley 26 attached on the main shaft 28. The main shaft 28 is journaled in suitable bearing means, such as three speed pillow blocks, each designated 30, which in turn are secured to the base support 10. Three auxiliary drive shafts 32, 34 and 36 are mounted at right angles to one another as shown better in FIGURE 3 and are similarly journaled in two pillow block bearings 38, 38, one at or near each end of said shafts. The shafts 32 and 36, in turn, are disposed at right angles to and driven by the main drive shaft 28 by means of matched miter gears 40, 40 and 42, 42 carried by the respective shafts as shown better in FIGURE 3. Another set of miter gears 44, 44, complementally carried by the other end of shaft 32 and by the adjacent end of the shaft 34, provide the means for driving said shaft 34, and its related cutting blade, as will be described in more detail. All of the bearing blocks preferably have oil impregnated bronze bushings. The drive shafts are held in their respective positions by appropriate means such as shaft collars 46.

Each of the aforesaid drive shafts supports a uniform diameter, toothed cutting blade 48 disposed at right angles to the axis of its respective shaft such that each two opposed blades are aligned in a coplanar manner in pairs, with the plane of one pair being at right angles to the plane of the other pair. Each blade 48 is mounted for rotation on an individual stub shaft 50, disposed generally parallel to and above the lower drive shaft, said shafts 50 each being mounted in a bearing sleeve member 52, which, in turn, is carried on the upper end of a rocker arm 54. Each of the four rocker arms 54 is further journaled to a separate one of the drive shafts, as by a sleeve member 56.

A drive pulley 58 is keyed or otherwise suitably secured to each of the drive shafts 28, 32, 34 and 36, preferably as shown intermediate the miter gear and the sleeve member 56. A driven pulley 60 is keyed or otherwise suitably secured to the end of each blade stub shaft 50 opposite from the blade 48 and in alignment with and above the drive pulley 58. A friction drive belt 62 operatively interconnects the pulleys 58 and 60 and suitable tension means, which may be an adjustable arm carried roller designated generally at 64, is provided in association therewith.

It is apparent that each blade and blade shaft sub-assembly are pivotally or rockably mounted on and above their respective drive shafts. These sub-assemblies are provided with resilient mounting means which includes limit means to preclude the blades, in their relative assembled condition, from moving past dead center into conflicting engagement with one another. The said limit means is illustrated as a rigid bolt 66, having one end rigidly secured to a medial portion of a fixed upright frame member 68 at each side of frame 10 and with the shank thereof projecting generally horizontally toward the center of the machine. Bolt 66 slidably projects through an aperture 67 in and adjustably interconnects with the rocker arm 54 by means of a plurality of threaded adjustment nuts 69 disposed on both sides of the arm 54. The resilient means is illustrated as an expansion spring 70, disposed around each of said bolts 66 and resiliently engageable with the rocker arm 54 and the upright 68.

The stripping finger means, designated generally at 72, together with a plurality of blade-accommodating slot-defined, knife-like extremities 74 (FIG. 2) formed on the depitting tube 73 and having curvilinear camming surfaces 75, aid in the removal of the fruit quarters from the pit. The quartered fruit pieces are also guided away from the open end of the smaller diameter depitting tube 73 by means of the obliquely disposed stripping members (to be described), and within the confines of a fruit collecting and guide tube 71. Tube 73, disposed centrally of and extends below the converging blades through the base support. Said means 72 are supported from a horizontally disposed hanger arm 76 attached to and projecting inwardly from the upper end of each of the upright frame members 68 and said means 72 are resiliently mounted in much the same manner as are the blade assemblies. Each means 72 comprises a rockable lever 77 attached to a stub shaft 78 which is pivotally or rotatably mounted with one end in a sleeve member 80 affixed to the hanger arm 74, said shaft 78 being held in position by any suitable means such as a collar 82. The stripping means further comprises a stripping member or finger 84 having an oblique forward edge 85 adapted for disposition closely adjacent one of a pair of adjacently intersecting blades and a lateral edge 86 for disposition closely adjacent or against the other of said blades, as shown in FIG. 2. The member 84 is attached to its arm 87 and mounting bracket 88 which preferably adjustably attaches member 84 to the other end of shaft 78. Each lever 77 is resiliently attached to an upright frame member 68 in the same manner as the blade resilient mounting, by means of an adjustable limit bolt 90 and spring 92 disposed around said bolt 90 and between lever 77 and frame member 68.

Suitable protective screen panels designated generally at S are provided for removable attachment to the base and frame, and are shown in their assembled condition in FIG. 1. Also in FIG. 1 there is shown an extension 94 for the fruit entry tube 96 (shown in FIG. 2) which is vertically and centrally disposed slightly above the intersection of the planes of the paired cutting blade assemblies. At the lower extremity of said tube 96 there are provided a plurality of preferably four equally spaced resilient spring-like centering fingers 98 for centralizing the fruit in the tube as its descends. A suitable discharge extension of the depitting or collection tube 73 is designated 99, through which pits and juice attendant with the operation are exhausted. A similar discharge tube or other means (not shown) is provided for directing the quartered fruit away from this machine to its next processing station.

*Operation*

The machine is powered by the electric motor 16, driving through the gear reducer 18 producing, for example, 25 r.p.m. on the output shaft 20 on which is mounted the variable pitch pulley 22. Friction drive belt 24 connects said pulley 22 with the constant speed pulley 26 which is attached to the main drive shaft 28. By sliding or shifting the motor in suitable adjustable mounting means (not shown) the pitch diameter of the pulley 22 is changeable and which, when coupled with the other pulley 26, will produce a variable speed drive for the machine, allowing it to be operated at different speeds.

Power is transferred from the main drive shaft 28 to the other drive shafts 32, 34, and 36 by the complemental pairs of intermeshing miter gears associated therewith. Said miter gears may be of the twenty-five tooth, ten pitch type. All of the drive shafts and blade shafts 78 rotate toward the center as viewed from the top. Power is further transmitted from the drive shafts to the blade shafts by means of friction belt 62 interconnecting the drive and driven sets of pulleys 58 and 60 respectively to effect simultaneous rotation of the resiliently mounted blades 48.

As the fruit is fed into the entering tube 96, either manually or preferably by automatic conveyor means associated (but now shown) therewith, it is guided gravitationally down said tube 96 where the resilient fingers 98 position it centrally over the blades. As the blades slice the fruit and the toothed peripheries of the blades come into contact with the pit, the blades on their mountings yieldably move back against the tension of their springs 70, and rather than cutting into the pit they follow the contour of and grasp and impellingly strip the pit from the fruit as both move downward. The descending fruit impinges on the obliquely disposed stripping blade or, which enters the saw cut, finger 84 rotating it downward about its shaft 78 in pivot 80 whereby the rocker arm 77 compresses its associated spring 92 with the limit bolt 90 moving freely through the associated mounting aperture in its rocker arm 77. It is to be understood that this mounting and action may be reversed. The resilience of the spring produces a reaction on the lever 77 in the opposite direction imparting springy travel thereof forward toward the center of the machine until it is stopped by the limit bolt 66 and associated nut 69. The springy return of stripping finger 84 imparts successively positive stripping action against successively descending fruit whereby a type of servo actuation and/or self energization of the resiliently mounted blade and stripping means is effected during operation thereof. Simultaneously and/or alternately the quarter segments which may have missed the initial stripping action of members 84 are caught from below by the pointed extremities 74 of the depitting tube 73 with the curvilinear camming surface 75 thereof acting generally medially of the segment to cooperate in stripping it from the pit.

After the pit has cleared the blades, the reaction of the springs 70 causes the blades to spring back to their normal position. Thus, the process of quartering and separating the pit is completed whereupon the pit is channeled down through the depitting tube 73 and out the discharge extension 99, while the fruit segments are collected through the fruit collection tube 71 and directed out of the machine to the next processing station, not shown, and cycle is automatically and continuously repeated.

Accordingly, it is apparent that an improved and useful machine has been evolved which achieves the stated advantages, including a simplified continuous, automatic and efficient low cost operation for substantially simultaneously quartering and depitting fruit by utilizing the pit within the fruit as a means for energizing the resiliently mounted cutting blades, and utilizing the passing fruit as means for energizing the resiliently mounted stripping fingers which together provide a more positive stripping of said fruit from the pit.

While a specific embodiment has been illustrated and described in detail, it will be obvious to those skilled in the art that many changes and variations may be made without departing from the spirit and scope of the invention as defined in the appended claims.

I claim:

1. A power driven machine for cyclically quartering and depitting ovaloidal fruit and the like comprising in combination:
   (a) a supporting base means having a central opening through which the fruit passes and having power driving means mounted thereon;
   (b) a plurality of cutting blade means including rotatable blades mounted with the planes thereof in a vertical converging manner and angularly spaced apart in a generally uniform manner about and above the central opening in said base;
   (c) means for mounting the blades in a resilient yieldable manner upon said base;
   (d) means for operatively driving said blades in a simultaneous manner;
   (e) generally vertically disposed means for feeding, retaining and guiding a succession of ovaloidal objets into a centered position over said blade means and for receiving and guiding the pits and quarter sections after each operational cycle;
   (f) resiliently mounted stripping means mounted on said base for aiding in the stripping and depitting of the quartered segments as said objects pass through said machine.

2. The machine as defined in claim 1 wherein:
   (a) the means for driving said plurality of blades include a like plurality of drive shafts generally symmetrically disposed around said central opening in the base and each being journaled in bearing means secured to said base;
   (b) said blades being mounted on stub shafts each of which is carried on a rocker arm pivotally attached to each of said drive shafts respectively; and
   (c) the stripping means include stripping members mounted on separate stub shafts, each of said shafts attached to a rocker arm and pivotally supported above said base by a frame member associated therewith, with each of said stripping members disposed adjacent the convergent intersection of an adjacent pair of blades.

3. The machine as defined in claim 1 wherein the means of sub-paragraph (e) include a plurality of concentric and coaxially disposed tube members.

4. The machine as defined in claim 1 wherein the means of sub-paragraph (e) include:
   (a) an open mouthed entry and guide tube having a diameter suitable to receive the ovaloidal objects, and supported centrally above the convergent intersection of the blades and a plurality of resilient centering fingers depending from said tube;
   (b) a combined depitting and pit collection tube of smaller diameter than the entry guide tube and disposed in vertical alignment therewith but spaced therefrom and extending below the cutting blades; and
   (c) a collecting and guiding tube of larger diameter than the respective entry and depitting tubes and coaxially disposed relative to the depitting tube.

5. The machine as defined in claim 1 wherein the means for driving the blades includes variable speed means associated therewith.

6. The machine as defined in claim 2 wherein the rocker arms of the blade mounting means and of the stripping member mounting means are each resiliently attached to a frame member carried by the base and include limit means in association therewith to preclude conflicting interengagement of the blades and stripping members.

7. A power drivable machine for quartering and depitting ovaloidal fruit and the like comprising in combination:
   (a) a supporting base means for mounting the components including means for adjustably mounting the power means and for providing variable speed drive thereof;
   (b) a plurality of rotatable toothed cutting blades with the planes thereof disposed in a vertical converging manner and means for uniformly driving said blade;
   (c) vertically disposed means for feeding, retaining and guiding a succession of ovaloidal objects into a centered position over the converging blade arrangement and for receiving and guiding the pits and quarter sections thereafter;
   (d) means for mounting the blades for resiliently yieldable movement relative to each other and to the central axis of the feeding, retaining and guide means; and
   (e) resiliently mounted stripping means for aiding the stripping of the quartered segments from the pit of the fruit;
   (f) said resiliently mounted blade and stripping means being servo actuated and self energized responsive to the blade teeth engaging and gripping rather than cutting into said pit and to a successive depressive action and snap-back reaction respectively thereof upon successive passage of the fruit through the machine.

References Cited

UNITED STATES PATENTS

| 786,482 | 4/1905 | Caldweld | 146—28 |
| 1,075,547 | 10/1913 | Caldweld | 146—28 |
| 1,862,732 | 6/1932 | Westcott | 146—28 X |
| 2,455,072 | 11/1948 | Lindley | 146—73 |

W. GRAYDON ABERCROMBIE, *Primary Examiner.*